United States Patent
Jiang et al.

(10) Patent No.: US 11,510,141 B2
(45) Date of Patent: Nov. 22, 2022

(54) METHOD, USER EQUIPMENT AND NETWORK SIDE DEVICE FOR MONITORING PHYSICAL DOWNLINK CONTROL CHANNEL

(71) Applicant: VIVO MOBILE COMMUNICATION CO., LTD., Guangdong (CN)

(72) Inventors: Dajie Jiang, Chang'an Dongguan (CN); Zichao Ji, Chang'an Dongguan (CN); Fei Qin, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 30 days.

(21) Appl. No.: 17/068,684

(22) Filed: Oct. 12, 2020

(65) Prior Publication Data

US 2021/0029637 A1    Jan. 28, 2021

Related U.S. Application Data

(63) Continuation of application No. PCT/CN2019/080101, filed on Mar. 28, 2019.

(30) Foreign Application Priority Data

Apr. 13, 2018 (CN) .......................... 201810331798.6

(51) Int. Cl.
*H04W 72/12* (2009.01)
*H04L 5/00* (2006.01)
*H04W 52/02* (2009.01)

(52) U.S. Cl.
CPC ....... *H04W 52/0216* (2013.01); *H04L 5/0005* (2013.01); *H04L 5/0094* (2013.01); *H04W 72/1289* (2013.01)

(58) Field of Classification Search
CPC .......... H04W 52/0216; H04W 72/1289; H04L 5/0005; H04L 5/0094
See application file for complete search history.

(56) References Cited

U.S. PATENT DOCUMENTS 10,869,295 B2 * 12/2020 Fu ..................... H04W 52/0229
2011/0200018 A1    8/2011 Tazeh Mahalleh et al.
(Continued)

FOREIGN PATENT DOCUMENTS

CN    101795461 A    8/2010
CN    102893569 A    1/2013
(Continued)

OTHER PUBLICATIONS

EP Search Report in Application No. 19784595.1 dated Apr. 30, 2021.
(Continued)

*Primary Examiner* — Brian P Cox
(74) *Attorney, Agent, or Firm* — Maschoff Brennan

(57) ABSTRACT

A method, a user equipment, and a network side device for monitoring a physical downlink control channel are provided. The method includes: receiving a physical layer signaling or an MAC layer signaling from a network side, wherein the physical layer signaling or the MAC layer signaling indicates a monitoring behavior of the UE or a plurality of UEs including the UE with respect to a PDCCH; determining the monitoring behavior of the UE with respect to the PDCCH according to the physical layer signaling or the MAC layer signaling.

20 Claims, 6 Drawing Sheets

(56) References Cited

U.S. PATENT DOCUMENTS

| | | |
|---|---|---|
| 2015/0085805 A1 | 3/2015 | Li et al. |
| 2015/0271744 A1* | 9/2015 | Liu .................. H04L 5/005 |
| | | 370/329 |
| 2016/0192335 A1 | 6/2016 | Kusashima et al. |
| 2017/0332359 A1* | 11/2017 | Tsai .................. H04L 5/0053 |
| 2017/0367046 A1 | 12/2017 | Papasakellariou |
| 2018/0302810 A1 | 10/2018 | Fujishiro |
| 2019/0159167 A1* | 5/2019 | Wong .................. H04W 68/02 |
| 2019/0281481 A1 | 9/2019 | Shen |
| 2021/0120577 A1 | 4/2021 | Jiang et al. |

FOREIGN PATENT DOCUMENTS

| | | |
|---|---|---|
| CN | 106454901 A | 2/2017 |
| CN | 107889254 A | 4/2018 |
| EP | 2 582 170 A1 | 4/2013 |
| JP | 2015020108 A1 | 3/2017 |
| WO | 2013178084 A1 | 12/2012 |
| WO | 2015164285 A1 | 10/2015 |
| WO | 2016186016 A1 | 11/2016 |
| WO | 2020011180 A1 | 1/2020 |

OTHER PUBLICATIONS

"Group-common PDCCH structure and configuration" 3GPP TSG RAN WG1 Meeting #89, CATT, R1-1707500, May 15, 2017.

CN Office Action in Application No. 201810331798.6 dated May 8, 2020.

"Remaining details on group[common PDCCH", Huawei, HiSilicon, 3GPP TSG RAN WG1 meeting 90bis, R1-1717063, Oct. 9, 2017.

Written Opinion and International Search Report in Application No. PCT/CN2019/080101 dated Oct. 22, 2020.

JP Office Action in Application No. 2020-556314 dated Nov. 22, 2021.

JP Office Action in Application No. 2020556314 dated Jun. 13, 2022.

\* cited by examiner

METHOD, USER EQUIPMENT AND NETWORK SIDE DEVICE FOR MONITORING PHYSICAL DOWNLINK CONTROL CHANNEL

CROSS-REFERENCE TO RELATED APPLICATIONS

The present application is a continuation of PCT Application No. PCT/CN2019/080101 filed on Mar. 28, 2019, which claims a priority to Chinese Patent Application No. 201810331798.6 filed in China on Apr. 13, 2018, the disclosure of which is incorporated herein by reference in its entirety.

TECHNICAL FIELD

The embodiments of the present disclosure relate to the field of communication technologies, and in particular to a method, a user equipment, and a network side device for monitoring a physical downlink control channel (Physical Downlink Control Channel, PDCCH).

BACKGROUND

At present, in long term evolution (Long Term Evolution, LTE) and a new radio (New Radio, NR) technology of fifth-generation (fifth-Generation, 5G) mobile communication, a user equipment (User Equipment, UE) usually performs PDCCH blind detection in each slot or subframe. If the UE receives a PDCCH belonging to the UE, the UE receives downlink data or transmits uplink data on a time-frequency resource indicated by the PDCCH. If the UE does not receive the PDCCH belonging to the UE, the UE continues to perform the PDCCH blind detection on a next slot or subframe or on a slot or subframe that conforms to a PDCCH monitoring period and offset configured by a base station.

Due to arrival time of service packets of many popular services, such as WeChat and web browsing, is random or uneven, in an actual network, when the UE is in an active state and continuously monitors the PDCCH, the PDCCH scheduling the UE cannot be received in all of slots or subframes. For slots or subframes in which the UE is not scheduled by the PDCCH, blind detection of the PDCCH by the UE in these slots or subframes will lead to power consumption of the UE.

In the NR technology, a high-level signaling can configure a slot format of the UE through following parameters: uplink-downlink-configuration-common (UL-DL-configuration-common), uplink-downlink-configuration-common-set 2 (UL-DL-configuration-common-Set2) or uplink-downlink-configuration-dedicated (UL-DL-configuration-dedicated). However, a slot format configured by the high-level signaling cannot quickly adapt to services with random or uneven arrival time of service packets.

The above-mentioned problems may still exist in subsequent evolved communication systems.

SUMMARY

In a first aspect, a method for determining an SFI is provided, which is operable by a UE and includes: receiving a physical layer signaling or a media access control (MAC) layer signaling from a network side, wherein the physical layer signaling or the MAC layer signaling indicates the SFI of the UE or a plurality of UEs including the UE; determine the SFI of the UE according to the physical layer signaling or the MAC layer signaling.

In a second aspect, a method for configuring a slot format indicator is provided, which is operable by a network side device and includes: transmitting a physical layer signaling or an MAC layer signaling to one or more UEs, wherein the physical layer signaling or the MAC layer signaling indicates an SFI of the one or more UEs.

In a third aspect, a method for monitoring a physical downlink control channel is provided, which is operable by a UE and includes: receiving a physical layer signaling or an MAC layer signaling from a network side, wherein the physical layer signaling or the MAC layer signaling indicates a monitoring behavior of the UE or a plurality of UEs including the UE with respect to a PDCCH; determining the monitoring behavior of the UE with respect to the PDCCH according to the physical layer signaling or the MAC layer signaling.

In a fourth aspect, a method for configuring a monitoring mode of a downlink control channel is further provided, which is operable by a network side device and includes: transmitting a physical layer signaling or an MAC layer signaling to one or more UEs, wherein the physical layer signaling or the MAC layer signaling indicates a monitoring behavior of the one or more UEs with respect to a PDCCH.

In a fifth aspect, a UE is further provided, including: a first receiving module, used to receive a physical layer signaling or a media access control (MAC) layer signaling from a network side, wherein the physical layer signaling or the MAC layer signaling indicates an SFI of the UE or a plurality of UEs including the UE; a first determining module, used to determine the SFI of the UE according to the physical layer signaling or the MAC layer signaling.

In a sixth aspect, a network side device is further provided, including: a first transmitting module, used to transmit a physical layer signaling or an MAC layer signaling to one or more UEs, wherein the physical layer signaling or the MAC layer signaling indicates an SFI of the one or more UEs.

In a seventh aspect, a UE is further provided, including: a second receiving module, used to receive a physical layer signaling or an MAC layer signaling from a network side, wherein the physical layer signaling or the MAC layer signaling indicates a monitoring behavior of the UE or a plurality of UEs including the UE with respect to a PDCCH; a second determining module, used to determine the monitoring behavior of the UE with respect to the PDCCH according to the physical layer signaling or the MAC layer signaling.

In an eighth aspect, a network side device is further provided, including: a second transmitting module, used to transmit a physical layer signaling or an MAC layer signaling to one or more UEs, wherein the physical layer signaling or the MAC layer signaling indicates a monitoring behavior of the one or more UEs with respect to the PDCCH.

In a ninth aspect, a user equipment is further provided, including: a processor, a memory, and a computer program stored in the memory and capable of being executed by the processor, wherein the processor is used to execute the computer program to implement the steps of the method for determining the SFI as described in the first aspect, or the steps of the method for monitoring the physical downlink control channel as described in the third aspect.

In a tenth aspect, a network side device is further provided, including: a processor, a memory, and a computer program stored in the memory and capable of being executed by the processor, wherein the processor is used to execute the computer program to implement the steps of the method for configuring the SFI as described in the third aspect, or the steps of the method for configuring the monitoring mode of the downlink control channel as described in the fourth aspect.

In an eleventh aspect, a computer-readable storage medium storing therein a computer program is further provided, wherein the computer program is used to be executed by a processor to implement the steps of the method for determining the SFI as described in the first aspect, or the steps of the method for configuring the SFI as described in the second aspect, or the steps of the method for monitoring the physical downlink control channel as described in the third aspect, or the steps of the method for configuring the monitoring mode of the downlink control channel as described in the fourth aspect.

BRIEF DESCRIPTION OF THE DRAWINGS

Various other advantages and benefits will become apparent to a person skilled in the art upon reading the detailed description of the preferred embodiments below. The accompanying drawings are only for the purpose of illustrating the preferred embodiments and are not considered to be a restriction on the present disclosure. Moreover, same reference numerals are used to represent same parts throughout the accompanying drawings. In the accompanying drawings.

DETAILED DESCRIPTION

Technical solutions in the embodiments of the present disclosure will be described clearly below in combination with the accompanying drawings in the embodiments of the present disclosure. Obviously, the described embodiments are merely a part of, rather than all of, the embodiments of the present disclosure. Based on the embodiments in the present disclosure, all other embodiments obtained by a person of ordinary skills in the art fall within the protection scope of the present disclosure.

The term "include" and any variants thereof in the specification and the claims of this application are intended to cover non-exclusive inclusions, for example, processes, methods, systems, products, or devices that include a series of steps or units need not be limited to those steps or units that are explicitly listed, but may include other steps or units that are not explicitly listed or that are inherent to these processes, methods, products, or devices. In addition, the term "and/or" that used in the specification and the claims indicates at least one of associated objects; for example, A and/or B indicates individual A, individual B, or both A and B.

In the embodiments of the present disclosure, such word as "exemplary" or "for example" is used as an example, illustration, or description. Any embodiment or design described as "exemplary" or "for example" in the embodiments of the present disclosure should not be construed as more preferred or advantageous over other embodiments or designs. Specifically, use of words such as "exemplary" or "for example" is intended to present related concepts in a concrete manner.

Figure 1:
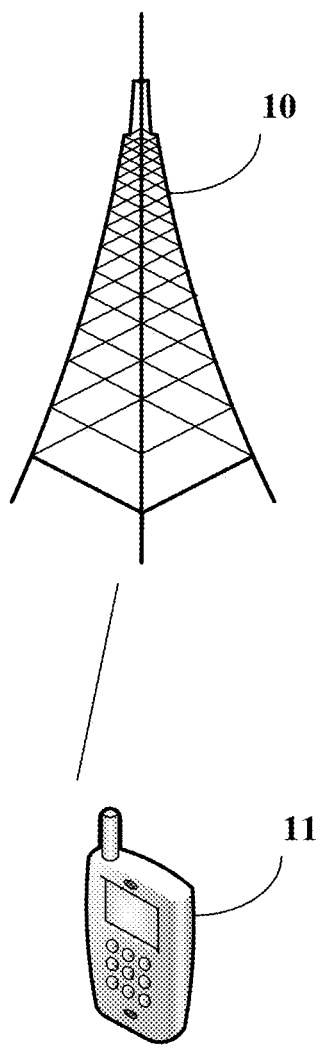
FIG. 1 is a schematic structural diagram of a wireless communication system according to an embodiment of the disclosure.

The embodiments of the present disclosure are described below in combination with the accompanying drawings. A method, a user equipment, and a network side device for configuring a physical downlink control channel provided by the embodiments of the present disclosure may be applied to a wireless communication system. The wireless communication system may be a 5G system, an evolved long term evolution (evolved Long Term Evolution, eLTE) system, or a subsequent evolved communication system. Refer to FIG. 1, a schematic structural diagram of a wireless communication system provided by an embodiment of the present disclosure is shown. As shown in FIG. 1, the wireless communication system may include: a network side device 10 and a user equipment. For example, the user equipment is denoted as UE 11, and the UE 11 may communicate with the network side device 10. In a practical application, a connection between the above devices may be a wireless connection. In order to conveniently and intuitively represent a connection relationship between various devices, a solid line is used in FIG. 1 for illustration.

It should be noted that the above wireless communication system may include a plurality of UEs, and a network side device may communicate with the plurality of UEs by transmitting signaling or transmitting data.

The network side device 10 provided by the embodiments of the present disclosure may be a base station, and the base station may be a commonly used base station, or an evolved node base station (evolved Node Base station, eNB), or a network side device in the 5G system (such as a next generation node base station (next generation Node Base station, gNB) or a transmission and reception point (Transmission and Reception Point, TRP)) or cell.

The user equipment provided in the embodiments of the present disclosure may be a mobile phone, a tablet computer, a notebook, an ultra-mobile personal computer (Ultra-Mobile Personal Computer, UMPC), a netbook, or a personal digital assistant (Personal Digital Assistant, PDA), etc.

It should be noted that a slot in the present disclosure may be a normal slot, for example, the normal slot is composed of 14 time domain symbols, or the slot may also be a mini slot (Mini Slot), which is composed of less than 14 time domain symbols, for example, a mini slot is composed of 2, 4 or 7 time domain symbols.

Naturally, the slot in the present disclosure may also be a transmission time interval (Transmission Time Interval, TTI), subframe, time domain scheduling granularity, etc.

Figure 2:
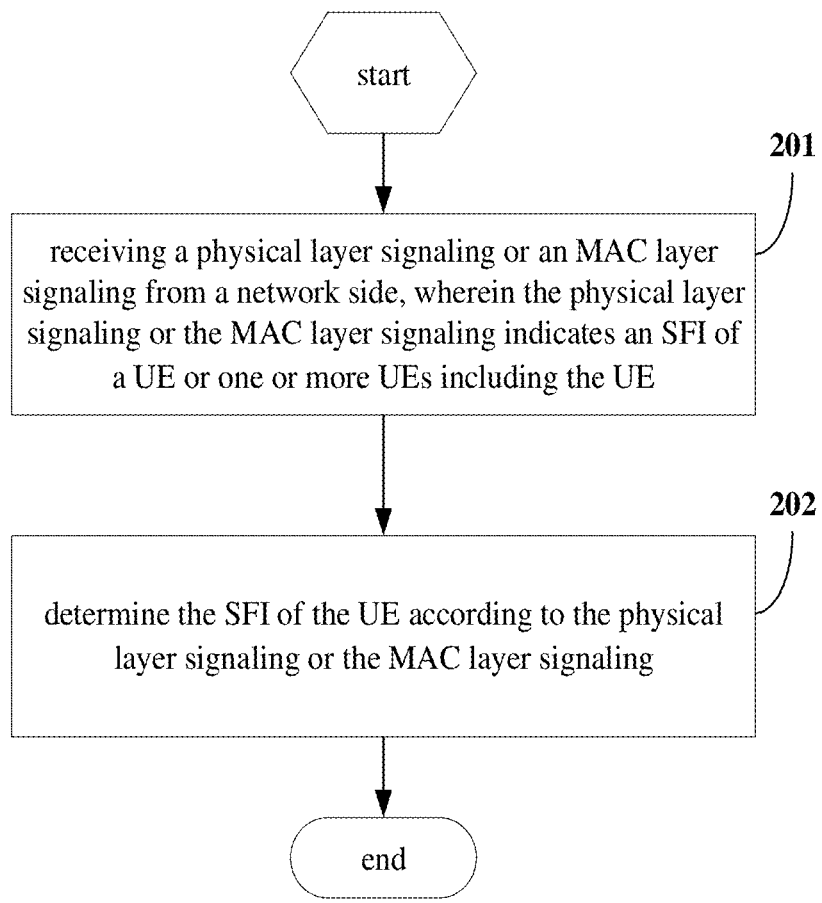
FIG. 2 is a first flowchart of a method for determining a slot format indicator according to an embodiment of the disclosure.

Referring to FIG. 2, which shows a flow of a method for configuring a slot format indicator (Slot Format Indicator, SFI) according to an embodiment of the present disclosure. The method is executed by the UE, and specific steps thereof are as follows.

Step 201: receiving a physical layer signaling or a media access control (MAC) layer signaling from a network side, wherein the physical layer signaling or the MAC layer signaling indicates the SFI of the UE or a plurality of UEs including the UE.

Specifically, in step 201, a physical layer signaling on a Physical Downlink Control Channel (PDCCH) with a first downlink control information (Downlink Control Information, DCI) format is received.

In the embodiments of the present disclosure, optionally, cyclic redundancy check (Cyclic Redundancy Check, CRC) of the PDCCH with the first DCI format is scrambled by a radio network temporary identifier (Radio Network Temporary Identifier, RNTI) dedicated to the UE, for example, a cell radio network temporary identifier (Cell Radio Network Temporary Identifier, C-RNTI) or a temporary cell-radio network temporary identifier (Temporary Cell-Radio Network Temporary Identifier, TC-RNTI);

In the embodiments of the present disclosure, optionally, the CRC of the PDCCH with the first DCI format is scrambled by an RNTI corresponding to the plurality of UEs, for example, a slot format indicator-radio network temporary identifier (SFI-RNTI) or another RNTI.

In the embodiments of the present disclosure, optionally, bits of the first DCI format include: an identifier of the first DCI format; and one or more slot format indicators, the one or more slot format indicators corresponding to a slot format of the UE on subsequent N slots, or corresponding to a slot format of the plurality of UEs including the UE on the subsequent N slots, wherein N is greater than or equal to 1.

For example, when a plurality of slot format indicators correspond to the slot format of the UE on the subsequent N slots, the plurality of slot format indicators include: a slot format indicator 1 (Slot Format Indicator 1), a slot format indicator 2, . . . , a slot format indicator N, wherein N represents N slots.

For another example, when the plurality of slot format indicators correspond to the slot format of the plurality of UEs including the UE on the subsequent N slots, the plurality of slot format indicators include: a slot format indicator 1 of a first UE, a slot format indicator 2 of the first UE, . . . , a slot format indicator N of the first UE, a slot format indicator 1 of a second UE, a slot format indicator 2 of the second UE, . . . , a slot format indicator N of the second UE, and so on, wherein N represents N slots.

In the embodiments of the present disclosure, optionally, for the bits of the first DCI format, it can reuse bits of an existing DCI format, for example, by using padding bits in the existing DCI format, or by changing a part of the bits in the existing DCI format to function as the bits of the first DCI format.

Step 202: determining the SFI of the UE according to the physical layer signaling or the MAC layer signaling.

Specifically, when a time domain symbol indicated by the SFI is an uplink symbol and/or a flexible symbol, a PDCCH is not monitored by the UE on the time domain symbol indicated by the SFI, wherein the flexible symbol may be configured as a symbol of the uplink symbol or a downlink symbol.

In the embodiments of the present disclosure, optionally, the SFI indicates a slot format (Slot Format, SF) of one or more UEs on the subsequent N slots, wherein N is greater than or equal to 1, for example, N is 10 slots, 20 slots or 40 slots. N is configured by the network side through a radio resource control (Radio Resource Control, RRC) signaling. Further, SFs of different UEs may be different.

In the embodiments of the present disclosure, optionally, there is a first interval between a first slot in which the physical layer signaling or the MAC layer signaling is received and a second slot in which the SFI is effective.

Further, the first interval is zero slot predefined by a protocol, or the first interval is a fixed number of slots predefined by the protocol, or a length of the first interval is configured by the network side, for example, configured through RRC signaling.

Although the NR technology also supports configuring an SFI of a group of UEs through the physical layer signaling such as DCI format 2_0, slot formats of a plurality of UEs configured in the DCI format 2_0 are same, which cannot meet requirements of diversified PDCCH monitoring behaviors of different UEs due to their respective different services. In addition, the DCI format 2_0 can indirectly prevent the UE from monitoring an unnecessary PDCCH by configuring the slot formats of the plurality of UEs, but it can only change a flexible symbol in a slot format configured by a high-level signaling (the uplink symbol or the downlink symbol cannot be changed), which is inefficient.

In this way, an SFI of the one or more UEs is configured through the physical layer signaling or the MAC layer signaling, and then services with random or uneven arrival time of service packets can be quickly adapted through the physical layer signaling or the MAC layer signaling.

Figure 3:
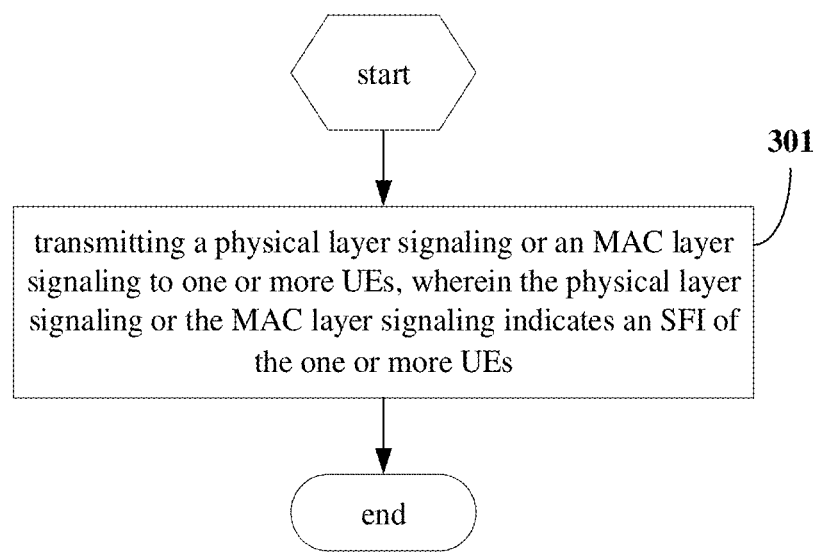
FIG. 3 is a second flowchart of a method for configuring the slot format indicator according to an embodiment of the disclosure.

Referring to FIG. 3, which shows a flow of a method for configuring a slot format indicator according to an embodiment of the present disclosure. The method is executed by a network side device, and specific steps thereof are as follows.

Step 301: transmitting a physical layer signaling or an MAC layer signaling to one or more UEs, wherein the physical layer signaling or the MAC layer signaling indicates an SFI of the one or more UEs.

Specifically, in step 301, the physical layer signaling is transmitted to the one or more UEs on a PDCCH with a first DCI format.

In the embodiments of the present disclosure, optionally, CRC of the PDCCH with the first DCI format is scrambled by an RNTI dedicated to the UE, such as a C-RNTI or a TC-RNTI;

In the embodiments of the present disclosure, optionally, the CRC of the PDCCH with the first DCI format is scrambled by an RNTI corresponding to a plurality of UEs, such as an SFI-RNTI or other RNTIs. In the embodiments of the present disclosure, optionally, bits of DCI in the first DCI format include: an identifier of the first DCI format, and one or more slot format indicators; the one or more slot format indicators corresponding to a slot format of one UE on subsequent N slots, or corresponding to a slot format of a plurality of UEs on the subsequent N slots; wherein N is greater than or equal to 1.

For example, when a plurality of slot format indicators correspond to a slot format of one UE on the subsequent N slots, the plurality of slot format indicators include: a slot format indicator 1 (Slot Format Indicator 1), a slot format indicator 2, . . . , a slot format indicator N, wherein N represents N slots.

For another example, when the plurality of slot format indicators correspond to the slot format of the plurality of UEs on the subsequent N slots, the plurality of slot format indicators include: a slot format indicator 1 of a first UE, a slot format indicator 2 of the first UE, . . . , a slot format indicator N of the first UE, a slot format indicator 1 of a second UE, a slot format indicator 2 of the second UE, . . . , a slot format indicator N of the second UE, and so on, wherein N represents N slots.

In the embodiments of the present disclosure, optionally, the SFI indicates a slot format (Slot Format, SF) of one or more UEs on the subsequent N slots, wherein N is greater than or equal to 1, for example, N is 10 slots, 20 slots or 40 slots. N is configured by the network side through an RRC signaling. Further, SFs of different UEs may be different.

In the embodiments of the present disclosure, optionally, for the bits of the first DCI format, it can reuse bits of an existing DCI format, for example, by using padding (padding) bits in the existing DCI format, or by changing part of the bits in the existing DCI format to function as the bits of the first DCI format.

In the embodiments of the present disclosure, optionally, when a time domain symbol indicated by the SFI is an uplink symbol and/or a flexible symbol, a PDCCH is not monitored by the UE on the time domain symbol indicated by the SFI, wherein the flexible symbol may be configured as a symbol of the uplink symbol or a downlink symbol.

In this way, the SFI of the one or more UEs is configured through the physical layer signaling or the MAC layer signaling, and then services with random or uneven arrival time of service packets can be quickly adapted through the physical layer signaling or the MAC layer signaling.

Figure 4:
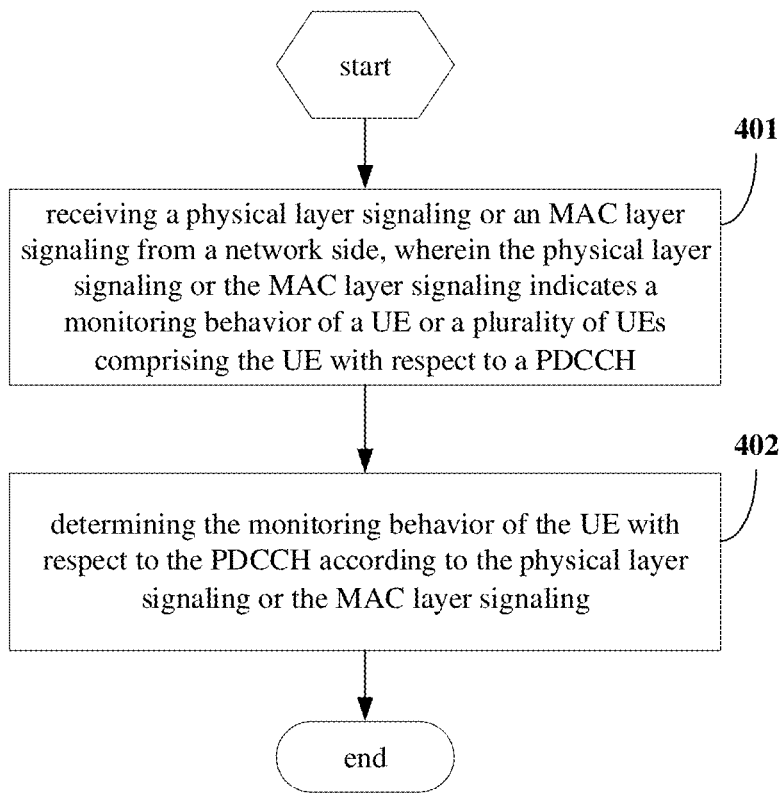
FIG. 4 is a first flowchart of a method for monitoring a physical downlink control channel according to an embodiment of the disclosure.

Referring to FIG. 4, which shows a flow of a method for monitoring a physical downlink control channel according to an embodiment of the present disclosure. The method is executed by the UE, and specific steps thereof are as follows.

Step 401: receiving a physical layer signaling or an MAC layer signaling from a network side, wherein the physical layer signaling or the MAC layer signaling indicates a monitoring behavior of the UE or a plurality of UEs including the UE with respect to a PDCCH;

Specifically, in step 401, a physical layer signaling on the PDCCH with a second DCI format is received.

In the embodiments of the present disclosure, optionally, CRC of the PDCCH with the second DCI format is scrambled by an RNTI dedicated to the UE, such as a C-RNTI or a TC-RNTI;

In the embodiments of the present disclosure, optionally, the CRC of the PDCCH with the second DCI format is scrambled by an RNTI corresponding to the plurality of UEs, such as an SFI-RNTI or another RNTI.

Step 402: determining the monitoring behavior of the UE with respect to the PDCCH according to the physical layer signaling or the MAC layer signaling.

In the embodiments of the present disclosure, the physical layer signaling or the MAC layer signaling indicating the monitoring behavior of the UE or the plurality of UEs including the UE with respect to the PDCCH includes at least one of following items (a) to (f).

(a) The physical layer signaling or the MAC layer signaling indicates a monitoring behavior of the UE or the plurality of UEs including the UE with respect to the PDCCH on subsequent N slots, wherein N is greater than or equal to 1.

For example, the physical layer signaling or the MAC layer signaling indicates the monitoring behavior of the UE with respect to the PDCCH on the subsequent N slots.

For example, with respect to a 10-bit bitmap, its position represents time of each of subsequent 10 slots, it indicates to monitor the PDCCH when 1 is set thereto, and it indicate to not monitor the PDCCH when 0 is set thereto.

For example, the physical layer signaling or the MAC layer signaling indicates that the monitoring behavior of the plurality of UEs including the UE with respect to the PDCCH on the subsequent N slots.

For example, a 40-bit bitmap indicates a monitoring behavior of 4 UEs, wherein first 10 bits represent whether a first UE monitors the PDCCH on the subsequent 10 slots, and its position represents the time of each of the subsequent 10 slots, it indicates to monitor the PDCCH when 1 is set thereto, and it indicate to not monitor the PDCCH when 0 is set thereto; the $11^{th}$-$20^{th}$ bits represents whether a second UE monitors the PDCCH on the subsequent 10 slots, and its position represents the time of each of the subsequent 10 slots, it indicates to monitor the PDCCH when 1 is set thereto, and it indicate to not monitor the PDCCH when 0 is set thereto; and so on.

(b) The physical layer signaling or the MAC layer signaling indicates the monitoring behavior of the UE or the plurality of UEs including the UE with respect to the PDCCH on the subsequent N slots and time domain symbols being monitored.

For example, the physical layer signaling or the MAC layer signaling indicates the monitoring behavior of the UE with respect to the PDCCH on the subsequent N slots and the time domain symbols being monitored.

For example, with respect to a 30-bit bitmap, a first bit indicates whether to monitor a PDCCH on a subsequent first slot, it indicates to monitor the PDCCH when 1 is set thereto, and it indicates to not monitor the PDCCH when 0 is set thereto. A second bit and a third bit jointly indicate on which symbols of the subsequent first slot the PDCCH is monitored. For example, "00" represents monitoring of the PDCCH on a first symbol, "01" represents monitoring of the PDCCH on first two symbols, "10" represents monitoring of the PDCCH on first three symbols, and "11" is reserved. The fourth bit represents whether to monitor the PDCCH on a subsequent second slot, it indicates to monitor the PDCCH when 1 is set thereto, and it indicates to not monitor the PDCCH when 0 is set thereto. A fifth bit and a sixth bit jointly indicate on which symbols of the subsequent second slot the PDCCH is monitored, for example, "00" represents monitoring of the PDCCH on the first symbol, "01" represents monitoring of the PDCCH on the first two symbols, and "10" represents monitoring of the PDCCH on the first three symbols, and "11" is reserved; and so on.

For example, the physical layer signaling or the MAC layer signaling indicates that the monitoring behavior of the plurality of UEs including the UE with respect to the PDCCH on the subsequent N slots and the time domain symbols being monitored.

For example, a 120-bit bitmap indicates the monitoring behavior of 4 UEs, first 30 bits represent a monitoring behavior of the first UE with respect to the PDCCH on the subsequent 10 slots and the time domain symbols being monitored. A first bit indicates whether to monitor a PDCCH on a subsequent first slot, it indicates to monitor the PDCCH when 1 is set thereto, and it indicates to not monitor the PDCCH when 0 is set thereto. A second bit and a third bit jointly indicate on which symbols of the subsequent first slot the PDCCH is monitored, for example, "00" represents monitoring of the PDCCH on a first symbol, "01" represents monitoring of the PDCCH on first two symbols, "10" represents monitoring of the PDCCH on first three symbols, and "11" is reserved. The fourth bit represents whether to monitor the PDCCH on a subsequent second slot, it indicates to monitor the PDCCH when 1 is set thereto, and it indicates to not monitor the PDCCH when 0 is set thereto. A fifth bit and a sixth bit jointly indicate on which symbols of the subsequent second slot the PDCCH is monitored, for example, "00" represents monitoring of the PDCCH on the first symbol, "01" represents monitoring of the PDCCH on the first two symbols, and "10" represents monitoring of the PDCCH on the first three symbols, and "11" is reserved, and so on. Thirty-first bit to sixtieth bit represent a monitoring behavior of the second UE with respect to the PDCCH on the subsequent 10 slots and the time domain symbols being monitored; and so on.

(c) The physical layer signaling or the MAC layer signaling indicates a monitoring behavior of the UE or the plurality of UEs including the UE with respect to a PDCCH with one or more DCI formats on the subsequent N slots.

Specifically, a bit can be added to the DCI to indicate which DCI format or DCI formats are subjected to.

(d) The physical layer signaling or the MAC layer signaling indicates a monitoring behavior of the UE or the plurality of UEs including the UE with respect to a PDCCH with one or more RNTI types on the subsequent N slots.

Specifically, a bit can be added to the DCI to indicate which RNTI or RNTIs are subjected to.

(e) The physical layer signaling or the MAC layer signaling indicates a monitoring behavior of the UE or the plurality of UEs including the UE with respect to a PDCCH belonging to one or more search spaces on the subsequent N slots.

Specifically, a bit can be added to the DCI to indicate which search space or search spaces are subjected to.

(f) The physical layer signaling or the MAC layer signaling indicates a monitoring behavior of the UE or the plurality of UEs including the UE with respect to a PDCCH belonging to one or more search space types on the subsequent N slots.

Specifically, a bit can be added to the DCI to indicate which search space type or search space types are subjected to.

In the above (a) to (f), N is greater than or equal to 1.

In the embodiments of the present disclosure, optionally, the monitoring behavior includes at least one of: being whether to monitor the PDCCH on the subsequent N slots; and monitoring the PDCCH on a target time domain symbol of the subsequent N slots, wherein the UE or the plurality of UEs including the UE monitor the PDCCH on the target time domain symbol.

In the embodiments of the present disclosure, optionally, the subsequent N slots include at least one of: subsequent N continuous or discontinuous slots; subsequent N continuous or discontinuous downlink slots; subsequent N continuous or discontinuous downlink slots and/or flexible slots; wherein a time domain symbol included in the downlink slot is a downlink symbol or a flexible symbol, and the flexible slot is a symbol of an uplink slot or the downlink slot, wherein a time domain symbol included in the uplink slot is the uplink symbol or the flexible symbol.

In the embodiments of the present disclosure, optionally, there is a second interval between a third slot in which the physical layer signaling or the MAC layer signaling is received and a first slot in the subsequent N slots, wherein the second interval is zero slot predefined by a protocol or a fixed number of slots predefined by the protocol, or a length of the second interval is configured by the network side.

In the embodiments of the present disclosure, a monitoring behavior of one or more UEs is indicated through the physical layer signaling or the MAC signaling, which can reduce power consumption caused by the UE monitoring an unnecessary PDCCH.

Figure 5:
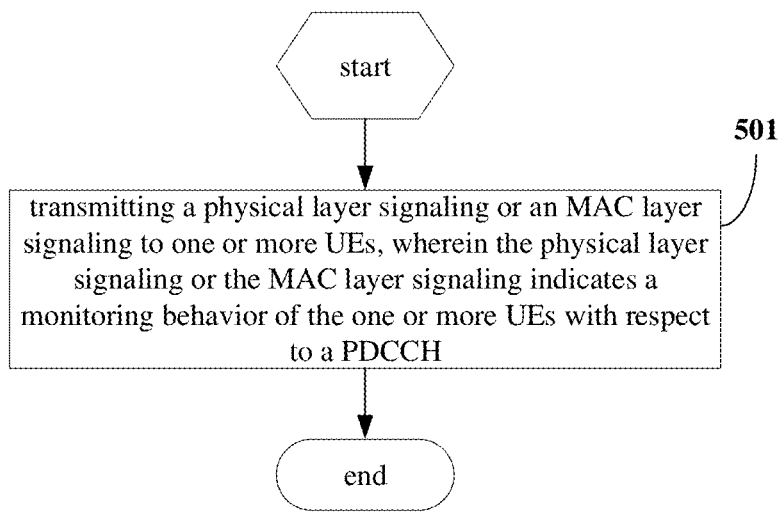
FIG. 5 is a second flowchart of a method for configuring a monitoring mode of the physical downlink control channel according to an embodiment of the disclosure.

Referring to FIG. 5, which shows a flow of a method for configuring a downlink control channel monitoring mode according to an embodiment of the present disclosure. The method is executed by a network side device, and specific steps are as follows:

Step 501: transmitting a physical layer signaling or an MAC layer signaling to one or more UEs, wherein the physical layer signaling or the MAC layer signaling indicates a monitoring behavior of the one or more UEs with respect to a PDCCH.

Specifically, in step 501, the physical layer signaling is transmitted to the one or more UEs on a PDCCH with a second DCI format.

In the embodiments of the present disclosure, optionally, CRC of the PDCCH with the second DCI format is scrambled by an RNTI dedicated to the UE, such as a C-RNTI or a TC-RNTI;

In the embodiments of the present disclosure, optionally, the CRC of the PDCCH with the second DCI format is scrambled by an RNTI corresponding to a plurality of UEs, such as an SFI-RNTI or another RNTI.

In the embodiments of the present disclosure, the physical layer signaling or the MAC layer signaling indicating the monitoring behavior of the UE or the plurality of UEs including the UE with respect to the PDCCH includes at least one of following items (a) to (f).

(a) The physical layer signaling or the MAC layer signaling indicates a monitoring behavior of the UE or the plurality of UEs including the UE with respect to the PDCCH on subsequent N slots, wherein N is greater than or equal to 1. For example, N is 10 slot, 20 slots or 40 slots. N is configured by the network side through an RRC signaling.

For example, the physical layer signaling or the MAC layer signaling indicates a monitoring behavior of the UE with respect to the PDCCH on the subsequent N slots.

For example, with respect to a 10-bit bitmap, its position represents time of each of subsequent 10 slots, it indicates to monitor the PDCCH when 1 is set thereto, and it indicate to not monitor the PDCCH when 0 is set thereto.

For example, the physical layer signaling or the MAC layer signaling indicates that the monitoring behavior of the plurality of UEs including the UE with respect to the PDCCH on the subsequent N slots.

For example, a 40-bit bitmap indicates a monitoring behavior of 4 UEs, wherein first 10 bits represent whether a first UE monitors the PDCCH on the subsequent 10 slots, and its position represents the time of each of the subsequent 10 slots, it indicates to monitor the PDCCH when 1 is set thereto, and it indicate to not monitor the PDCCH when 0 is set thereto; the $11^{th}$-$20^{th}$ bits represents whether a second UE monitors the PDCCH on the subsequent 10 slots, and its position represents the time of each of the subsequent 10 slots, it indicates to monitor the PDCCH when 1 is set thereto, and it indicate to not monitor the PDCCH when 0 is set thereto; and so on.

(b) The physical layer signaling or the MAC layer signaling indicates the monitoring behavior of the UE or the plurality of UEs including the UE with respect to the PDCCH on the subsequent N slots and time domain symbols being monitored.

For example, the physical layer signaling or the MAC layer signaling indicates the monitoring behavior of the UE with respect to the PDCCH on the subsequent N slots and the time domain symbols being monitored.

For example, with respect to a 30-bit bitmap, a first bit indicates whether to monitor a PDCCH on a subsequent first slot, it indicates to monitor the PDCCH when 1 is set thereto, and it indicates to not monitor the PDCCH when 0 is set thereto. A second bit and a third bit jointly indicate on which symbols of the subsequent first slot the PDCCH is monitored. For example, "00" represents monitoring of the PDCCH on a first symbol, "01" represents monitoring of the PDCCH on first two symbols, "10" represents monitoring of the PDCCH on first three symbols, and "11" is reserved. The fourth bit represents whether to monitor the PDCCH on a subsequent second slot, it indicates to monitor the PDCCH when 1 is set thereto, and it indicates to not monitor the PDCCH when 0 is set thereto. A fifth bit and a sixth bit jointly indicate on which symbols of the subsequent second slot the PDCCH is monitored, for example, "00" represents monitoring of the PDCCH on the first symbol, "01" represents monitoring of the PDCCH on the first two symbols, and "10" represents monitoring of the PDCCH on the first three symbols, and "11" is reserved; and so on.

For example, the physical layer signaling or the MAC layer signaling indicates that the monitoring behavior of the plurality of UEs including the UE with respect to the PDCCH on the subsequent N slots and the time domain symbols being monitored.

For example, a 120-bit bitmap indicates the monitoring behavior of 4 UEs, first 30 bits represent a monitoring behavior of the first UE with respect to the PDCCH on the subsequent 10 slots and the time domain symbols being monitored. A first bit indicates whether to monitor a PDCCH on a subsequent first slot, it indicates to monitor the PDCCH when 1 is set thereto, and it indicates to not monitor the PDCCH when 0 is set thereto. A second bit and a third bit jointly indicate on which symbols of the subsequent first slot the PDCCH is monitored, for example, "00" represents monitoring of the PDCCH on a first symbol, "01" represents monitoring of the PDCCH on first two symbols, "10" represents monitoring of the PDCCH on first three symbols, and "11" is reserved. The fourth bit represents whether to monitor the PDCCH on a subsequent second slot, it indicates to monitor the PDCCH when 1 is set thereto, and it indicates to not monitor the PDCCH when 0 is set thereto. A fifth bit and a sixth bit jointly indicate on which symbols of the subsequent second slot the PDCCH is monitored, for example, "00" represents monitoring of the PDCCH on the first symbol, "01" represents monitoring of the PDCCH on the first two symbols, and "10" represents monitoring of the PDCCH on the first three symbols, and "11" is reserved, and so on. Thirty-first bit to sixtieth bit represent a monitoring behavior of the second UE with respect to the PDCCH on the subsequent 10 slots and the time domain symbols being monitored; and so on.

(c) The physical layer signaling or the MAC layer signaling indicates a monitoring behavior of the UE or the plurality of UEs including the UE with respect to a PDCCH with one or more DCI formats on the subsequent N slots.

Specifically, a bit can be added to the DCI to indicate which DCI format or DCI formats are subjected to.

(d) The physical layer signaling or the MAC layer signaling indicates a monitoring behavior of the UE or the plurality of UEs including the UE with respect to a PDCCH with one or more RNTI types on the subsequent N slots;

Specifically, a bit can be added to the DCI to indicate which RNTI or RNTIs are subjected to.

(e) The physical layer signaling or the MAC layer signaling indicates a monitoring behavior of the UE or the plurality of UEs including the UE with respect to a PDCCH belonging to one or more search spaces on the subsequent N slots.

Specifically, a bit can be added to the DCI to indicate which search space or search spaces are subjected to.

(f) The physical layer signaling or the MAC layer signaling indicates a monitoring behavior of the UE or the plurality of UEs including the UE with respect to a PDCCH belonging to one or more search space types on the subsequent N slots.

Specifically, a bit can be added to the DCI to indicate which search space type or search space types are subjected to.

In the above (a) to (f), N is greater than or equal to 1.

In the embodiments of the present disclosure, optionally, the monitoring behavior includes at least one of: being whether to monitor the PDCCH on the subsequent N slots; and monitoring the PDCCH on a target time domain symbol of the subsequent N slots, wherein the UE or the plurality of UEs including the UE monitor the PDCCH on the target time domain symbol.

In the embodiments of the present disclosure, optionally, the subsequent N slots include at least one of: subsequent N continuous or discontinuous slots; subsequent N continuous or discontinuous downlink slots; subsequent N continuous or discontinuous downlink slots and/or flexible slots; wherein a time domain symbol included in the downlink slot is a downlink symbol or a flexible symbol, and the flexible slot is a symbol of an uplink slot or the downlink slot, wherein a time domain symbol included in the uplink slot is the uplink symbol or the flexible symbol.

In the embodiments of the present disclosure, optionally, there is a second interval between a third slot in which the physical layer signaling or the MAC layer signaling is received and a first slot in the subsequent N slots, wherein the second interval is zero slot or a fixed number of slots predefined by the protocol, or a length of the second interval is configured by the network side.

In the embodiments of the present disclosure, a monitoring behavior of one or more UEs is indicated through the physical layer signaling or the MAC signaling, which can reduce power consumption caused by the UE monitoring an unnecessary PDCCH.

A user equipment is further provided in the embodiments of the present disclosure. Since a principle of solving a problem by the user equipment is similar to the method for determining the SFI in the embodiments of the present disclosure, it may refer to an implementation of the method for an implementation of the user equipment, and a description thereof will not be repeated herein.

Figure 6:
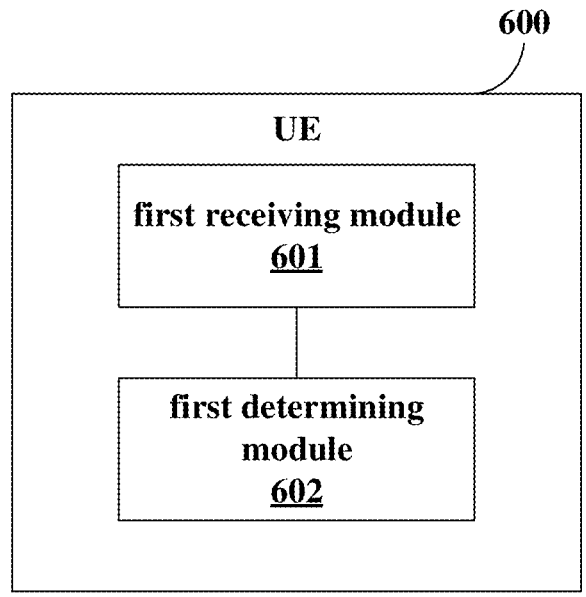
FIG. 6 is a first structural diagram of a user equipment according to an embodiment of the disclosure.

Referring to FIG. 6, which shows a structural diagram of a UE according to an embodiment of the present disclosure, and the UE 600 includes: a first receiving module 601, used to receive a physical layer signaling or a media access control (MAC) layer signaling from a network side, wherein the physical layer signaling or the MAC layer signaling indicates an SFI of the UE or a plurality of UEs including the UE; a first determining module 602, used to determine the SFI of the UE according to the physical layer signaling or the MAC layer signaling.

Specifically, when a time domain symbol indicated by the SFI is an uplink symbol and/or a flexible symbol, a PDCCH is not monitored by the UE on the time domain symbol indicated by the SFI, wherein the flexible symbol may be configured as a symbol of the uplink symbol or a downlink symbol.

In the embodiments of the present disclosure, optionally, the receiving module 601 is further used to receive a physical layer signaling on the PDCCH with the first DCI format.

In the embodiments of the present disclosure, optionally, CRC of the PDCCH with the first DCI format is scrambled by an RNTI dedicated to the UE, such as a C-RNTI TC-RNTI.

In the embodiments of the present disclosure, optionally, the CRC of the PDCCH with the first DCI format is scrambled by an RNTI corresponding to a plurality of UEs, such as an SFI-RNTI or another RNTI.

In the embodiments of the present disclosure, optionally, bits of the first DCI format include: an identifier of the first DCI format; and one or more slot format indicators, the one or more slot format indicators corresponding to a slot format of the UE on subsequent N slots, or corresponding to a slot format of the plurality of UEs including the UE on the subsequent N slots.

For example, when a plurality of slot format indicators correspond to the slot format of the UE on the subsequent N slots, the plurality of slot format indicators include: a slot format indicator 1 (Slot Format Indicator 1), a slot format indicator 2, . . . , a slot format indicator N, wherein N represents N slots.

For another example, when the plurality of slot format indicators correspond to the slot format of the plurality of UEs including the UE on the subsequent N slots, the plurality of slot format indicators include: a slot format indicator 1 of a first UE, a slot format indicator 2 of the first UE, . . . , a slot format indicator N of the first UE, a slot format indicator 1 of a second UE, a slot format indicator 2 of the second UE, . . . , a slot format indicator N of the second UE, and so on, wherein N represents N slots.

In the embodiments of the present disclosure, optionally, the SFI indicates a slot format (Slot Format, SF) of one or more UEs on the subsequent N slots, wherein N is greater than or equal to 1. Further, SFs of different UEs may be different.

In the embodiments of the present disclosure, optionally, there is a first interval between a first slot in which the physical layer signaling or the MAC layer signaling is received and a second slot in which the SFI is effective. Further, the first interval is zero slot predefined by a protocol, or the first interval is a fixed number of slots predefined by the protocol, or a length of the first interval is configured by the network side.

The user equipment provided by the embodiments of the present disclosure may execute the above method embodiments, and implementation principles and technical effects thereof are similar, a description thereof will not be repeated in this embodiment.

A network side device is further provided in the embodiments of the present disclosure. Since a principle of solving a problem by the network side device is similar to the method for configuring the SFI in the embodiments of the present disclosure, for an implementation of the network side device, it can refer to an implementation of the method, and a description thereof will not be repeated herein.

Figure 7:
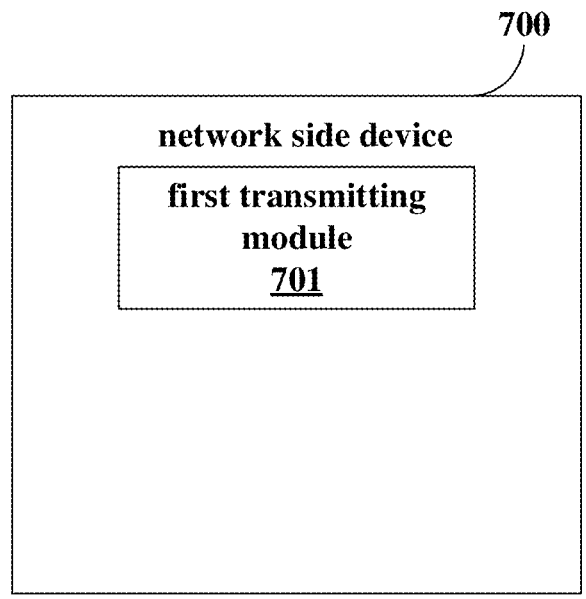
FIG. 7 is a first structural diagram of a network side device according to an embodiment of the disclosure.

Referring to FIG. 7, which shows a structural diagram of a network side device according to an embodiment of the present disclosure. The network side device 700 includes: a first transmitting module 701, used to transmit a physical layer signaling or an MAC layer signaling to one or more UEs, wherein the physical layer signaling or the MAC layer signaling indicates an SFI of the one or more UEs.

In the embodiments of the present disclosure, optionally, the first transmitting module 701 is further used to transmit the physical layer signaling to the one or more UEs on a PDCCH with a first DCI format.

In the embodiments of the present disclosure, optionally, CRC of the PDCCH with the first DCI format is scrambled by an RNTI dedicated to the UE, such as a C-RNTI or a TC-RNTI;

In the embodiments of the present disclosure, optionally, the CRC of the PDCCH with the first DCI format is scrambled by an RNTI corresponding to a plurality of UEs, such as an SFI-RNTI or other RNTIs.

In the embodiments of the present disclosure, optionally, bits of DCI in the first DCI format include: an identifier of the first DCI format, and one or more slot format indicators; the one or more slot format indicators corresponding to a slot format of one UE on subsequent N slots, or corresponding to a slot format of a plurality of UEs on the subsequent N slots; wherein N is greater than or equal to 1.

In the embodiments of the present disclosure, optionally, the SFI indicates a slot format of one or more UEs on the subsequent N slots, wherein N is greater than or equal to 1.

In the embodiments of the present disclosure, optionally, when a time domain symbol indicated by the SFI is an uplink symbol and/or a flexible symbol, it indicates that a PDCCH is not monitored by the UE on the time domain symbol indicated by the SFI, wherein the flexible symbol may be configured as a symbol of the uplink symbol or a downlink symbol.

The network side device provided by the embodiments of the present disclosure may execute the above method embodiments, and implementation principles and technical effects thereof are similar, a description thereof will not be repeated in this embodiment.

A user equipment is further provided in the embodiments of the present disclosure. Since a principle of solving a problem by the user equipment is similar to the method for monitoring the physical downlink control channel in the embodiments of the present disclosure, an implementation of the user equipment may refer to an implementation of the method, and a description thereof will not be repeated herein.

Figure 8:
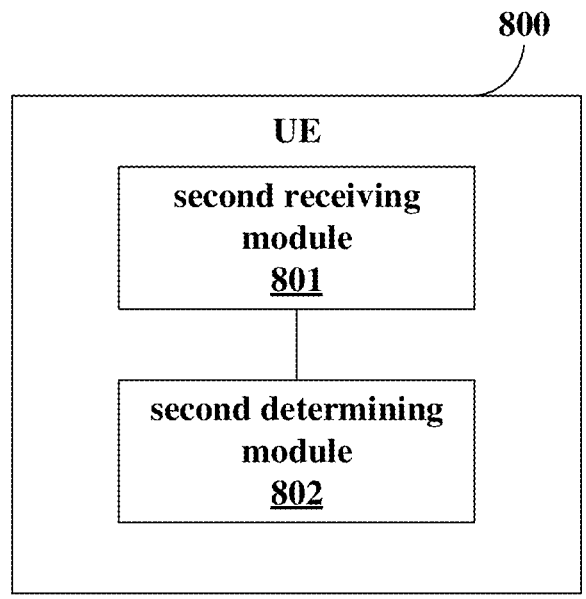
FIG. 8 is a second structural diagram of the user equipment according to an embodiment of the disclosure.

Referring to FIG. 8, which shows a structural diagram of a UE according to an embodiment of the present disclosure, and the UE 800 includes: a second receiving module 801, used to receive a physical layer signaling or an MAC layer signaling from a network side, wherein the physical layer signaling or the MAC layer signaling indicates a monitoring behavior of the UE or a plurality of UEs including the UE with respect to a PDCCH; a second determining module 802, used to determine the monitoring behavior of the UE with respect to the PDCCH according to the physical layer signaling or the MAC layer signaling.

In the embodiments of the present disclosure, optionally, the second receiving module 801 is further used to receive a physical layer signaling on the PDCCH with a second DCI format.

In the embodiments of the present disclosure, optionally, CRC of the PDCCH with the second DCI format is scrambled by an RNTI dedicated to the UE, such as a C-RNTI or a TC-RNTI.

In the embodiments of the present disclosure, optionally, the CRC of the PDCCH with the second DCI format is scrambled by an RNTI corresponding to the plurality of UEs, such as an SFI-RNTI or another RNTIs.

In the embodiments of the present disclosure, the physical layer signaling or the MAC layer signaling indicating the monitoring behavior of the UE or the plurality of UEs including the UE with respect to the PDCCH includes at least one of following items (a) to (f).

(a) The physical layer signaling or the MAC layer signaling indicates a monitoring behavior of the UE or the plurality of UEs including the UE with respect to the PDCCH on subsequent N slots, wherein N is greater than or equal to 1.

For example, the physical layer signaling or the MAC layer signaling indicates the monitoring behavior of the UE with respect to the PDCCH on the subsequent N slots.

For example, with respect to a 10-bit bitmap, its position represents time of each of subsequent 10 slots, it indicates to monitor the PDCCH when 1 is set thereto, and it indicate to not monitor the PDCCH when 0 is set thereto.

For example, the physical layer signaling or the MAC layer signaling indicates that the monitoring behavior of the plurality of UEs including the UE with respect to the PDCCH on the subsequent N slots.

For example, a 40-bit bitmap indicates a monitoring behavior of 4 UEs, wherein first 10 bits represent whether a first UE monitors the PDCCH on the subsequent 10 slots, and its position represents the time of each of the subsequent 10 slots, it indicates to monitor the PDCCH when 1 is set thereto, and it indicate to not monitor the PDCCH when 0 is set thereto; the $11^{th}$-$20^{th}$ bits represents whether a second UE monitors the PDCCH on the subsequent 10 slots, and its position represents the time of each of the subsequent 10 slots, it indicates to monitor the PDCCH when 1 is set thereto, and it indicate to not monitor the PDCCH when 0 is set thereto; and so on.

(b) The physical layer signaling or the MAC layer signaling indicates the monitoring behavior of the UE or the plurality of UEs including the UE with respect to the PDCCH on the subsequent N slots and time domain symbols being monitored.

For example, the physical layer signaling or the MAC layer signaling indicates the monitoring behavior of the UE with respect to the PDCCH on the subsequent N slots and the time domain symbols being monitored.

For example, with respect to a 30-bit bitmap, a first bit indicates whether to monitor a PDCCH on a subsequent first slot, it indicates to monitor the PDCCH when 1 is set thereto, and it indicates to not monitor the PDCCH when 0 is set thereto. A second bit and a third bit jointly indicate on which symbols of the subsequent first slot the PDCCH is monitored. For example, "00" represents monitoring of the PDCCH on a first symbol, "01" represents monitoring of the PDCCH on first two symbols, "10" represents monitoring of the PDCCH on first three symbols, and "11" is reserved. The fourth bit represents whether to monitor the PDCCH on a subsequent second slot, it indicates to monitor the PDCCH when 1 is set thereto, and it indicates to not monitor the PDCCH when 0 is set thereto. A fifth bit and a sixth bit jointly indicate on which symbols of the subsequent second slot the PDCCH is monitored, for example, "00" represents monitoring of the PDCCH on the first symbol, "01" represents monitoring of the PDCCH on the first two symbols, and "10" represents monitoring of the PDCCH on the first three symbols, and "11" is reserved; and so on.

For example, the physical layer signaling or the MAC layer signaling indicates that the monitoring behavior of the plurality of UEs including the UE with respect to the PDCCH on the subsequent N slots and the time domain symbols being monitored.

For example, a 120-bit bitmap indicates the monitoring behavior of 4 UEs, first 30 bits represent a monitoring behavior of the first UE with respect to the PDCCH on the subsequent 10 slots and the time domain symbols being monitored. A first bit indicates whether to monitor a PDCCH on a subsequent first slot, it indicates to monitor the PDCCH when 1 is set thereto, and it indicates to not monitor the PDCCH when 0 is set thereto. A second bit and a third bit jointly indicate on which symbols of the subsequent first slot the PDCCH is monitored, for example, "00" represents monitoring of the PDCCH on a first symbol, "01" represents monitoring of the PDCCH on first two symbols, "10" represents monitoring of the PDCCH on first three symbols, and "11" is reserved. The fourth bit represents whether to monitor the PDCCH on a subsequent second slot, it indicates to monitor the PDCCH when 1 is set thereto, and it indicates to not monitor the PDCCH when 0 is set thereto. A fifth bit and a sixth bit jointly indicate on which symbols of the subsequent second slot the PDCCH is monitored, for example, "00" represents monitoring of the PDCCH on the first symbol, "01" represents monitoring of the PDCCH on the first two symbols, and "10" represents monitoring of the PDCCH on the first three symbols, and "11" is reserved. Thirty-first bit to sixtieth bit represent a monitoring behavior of the second UE with respect to the PDCCH on the subsequent 10 slots and the time domain symbols being monitored; and so on.

(c) The physical layer signaling or the MAC layer signaling indicates a monitoring behavior of the UE or the plurality of UEs including the UE with respect to a PDCCH with one or more DCI formats on the subsequent N slots;

Specifically, a bit can be added to the DCI to indicate which DCI format or DCI formats are subjected to.

(d) The physical layer signaling or the MAC layer signaling indicates a monitoring behavior of the UE or the plurality of UEs including the UE with respect to a PDCCH with one or more RNTI types on the subsequent N slots.

Specifically, a bit can be added to the DCI to indicate which RNTI or RNTIs are subjected to.

(e) The physical layer signaling or the MAC layer signaling indicates a monitoring behavior of the UE or the plurality of UEs including the UE with respect to a PDCCH belonging to one or more search spaces on the subsequent N slots.

Specifically, a bit can be added to the DCI to indicate which search space or search spaces are subjected to.

(f) The physical layer signaling or the MAC layer signaling indicates a monitoring behavior of the UE or the plurality of UEs including the UE with respect to a PDCCH belonging to one or more search space types on the subsequent N slots;

Specifically, a bit can be added to the DCI to indicate which search space type or search space types are subjected to.

In the above (a) to (f), N is greater than or equal to 1.

In the embodiments of the present disclosure, optionally, the monitoring behavior includes at least one of: being whether to monitor the PDCCH on the subsequent N slots; and monitoring the PDCCH on a target time domain symbol of the subsequent N slots, wherein the UE or the plurality of UEs including the UE monitor the PDCCH on the target time domain symbol.

In the embodiments of the present disclosure, optionally, the subsequent N slots include at least one of: subsequent N continuous or discontinuous slots; subsequent N continuous or discontinuous downlink slots; subsequent N continuous or discontinuous downlink slots and/or flexible slots;

wherein a time domain symbol included in the downlink slot is a downlink symbol or a flexible symbol, and the flexible slot is a symbol of an uplink slot or the downlink slot, wherein a time domain symbol included in the uplink slot is the uplink symbol or the flexible symbol.

In the embodiments of the present disclosure, optionally, there is a second interval between a third slot in which the physical layer signaling or the MAC layer signaling is received and a first slot in the subsequent N slots, wherein the second interval is zero slot predefined by a protocol or a fixed number of slots predefined by the protocol, or a length of the second interval is configured by the network side.

The user equipment provided by the embodiments of the present disclosure may execute the above method embodiments, and implementation principles and technical effects thereof are similar, a description thereof will not be repeated in this embodiment.

A network side device is further provided in the embodiments of the present disclosure. Since a principle of solving a problem by the network side device is similar to the method for configuring the monitoring mode of the downlink control channel in the embodiments of the present disclosure, for an implementation of the network side device, it can refer to an implementation of the method, and a description thereof will not be repeated herein.

Figure 9:
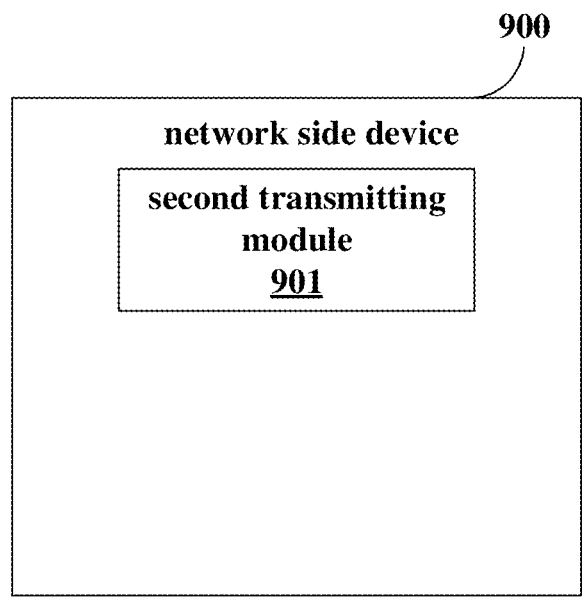
FIG. 9 is a second structural diagram of the network side device according to an embodiment of the disclosure.

Referring to FIG. 9, which shows a structural diagram of a network side device according to an embodiment of the present disclosure. The network side device 900 includes: a second transmitting module 901, used to transmit a physical layer signaling or an MAC layer signaling to one or more UEs, wherein the physical layer signaling or the MAC layer signaling indicates a monitoring behavior of the one or more UEs with respect to the PDCCH.

In the embodiments of the present disclosure, optionally, the second transmitting module 901 is further used to: transmit the physical layer signaling to the one or more UEs on a PDCCH with a second DCI format.

In the embodiments of the present disclosure, optionally, CRC of the PDCCH with the second DCI format is scrambled by an RNTI dedicated to the UE, such as a C-RNTI or a TC-RNTI.

In the embodiments of the present disclosure, optionally, the CRC of the PDCCH with the second DCI format is scrambled by an RNTI corresponding to the plurality of UEs, such as an SFI-RNTI or another RNTI.

In the embodiments of the present disclosure, the physical layer signaling or the MAC layer signaling indicating the monitoring behavior of the UE or the plurality of UEs including the UE with respect to the PDCCH includes at least one of: (a) that the physical layer signaling or the MAC layer signaling indicates a monitoring behavior of the UE or the plurality of UEs including the UE with respect to the PDCCH on subsequent N slots, wherein N is greater than or equal to 1; (b) that the physical layer signaling or the MAC layer signaling indicates the monitoring behavior of the UE or the plurality of UEs including the UE with respect to the PDCCH on the subsequent N slots and time domain symbols being monitored; (c) that the physical layer signaling or the MAC layer signaling indicates a monitoring behavior of the UE or the plurality of UEs including the UE with respect to a PDCCH with one or more DCI formats on the subsequent N slots; specifically, a bit can be added to the DCI to indicate which DCI format or DCI formats are subjected to; (d) that the physical layer signaling or the MAC layer signaling indicates a monitoring behavior of the UE or the plurality of UEs including the UE with respect to a PDCCH with one or more RNTI types on the subsequent N slots; specifically, a bit can be added to the DCI to indicate which RNTI or RNTIs are subjected to; (e) that the physical layer signaling or the MAC layer signaling indicates a monitoring behavior of the UE or the plurality of UEs including the UE with respect to a PDCCH belonging to one or more search spaces on the subsequent N slots; specifically, a bit can be added to the DCI to indicate which search space or search spaces are subjected to; (f) that the physical layer signaling or the MAC layer signaling indicates a monitoring behavior of the UE or the plurality of UEs including the UE with respect to a PDCCH belonging to one or more search space types on the subsequent N slots; specifically, a bit can be added to the DCI to indicate which search space type or search space types are subjected to.

In the above (a) to (f), N is greater than or equal to 1.

In the embodiments of the present disclosure, optionally, the monitoring behavior includes at least one of: being whether to monitor the PDCCH on the subsequent N slots; and monitoring the PDCCH on a target time domain symbol of the subsequent N slots, wherein the UE or the plurality of UEs including the UE monitor the PDCCH on the target time domain symbol.

In the embodiments of the present disclosure, optionally, the subsequent N slots include at least one of: subsequent N continuous or discontinuous slots; subsequent N continuous or discontinuous downlink slots; subsequent N continuous or discontinuous downlink slots and/or flexible slots; wherein a time domain symbol included in the downlink slot is a downlink symbol or a flexible symbol, and the flexible slot is a symbol of an uplink slot or the downlink slot, wherein a time domain symbol included in the uplink slot is the uplink symbol or the flexible symbol.

In the embodiments of the present disclosure, optionally, there is a second interval between a third slot in which the physical layer signaling or the MAC layer signaling is received and a first slot in the subsequent N slots, wherein the second interval is zero slot predefined by a protocol or a fixed number of slots predefined by the protocol, or a length of the second interval is configured by the network side.

The network side device provided by the embodiments of the present disclosure may execute the above method embodiments, and implementation principles and technical effects thereof are similar, a description thereof will not be repeated in this embodiment.

Figure 10:
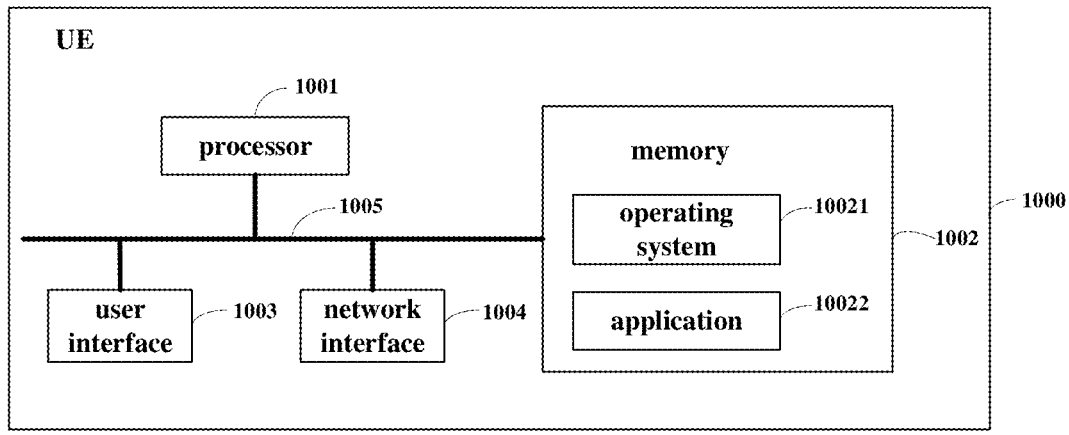
FIG. 10 is a third structural diagram of the user equipment according to an embodiment of the disclosure.

As shown in FIG. 10, the user equipment 1000 includes: at least one processor 1001, a memory 1002, at least one network interface 1004 and a user interface 1003. Various components in the user equipment 1000 are coupled together by a bus system 1005. It should be appreciated that the bus system 1005 is used to implement connection communication between these components. In addition to a data bus, the bus system 1005 further includes a power bus, a control bus, and a status signal bus. However, for clarity of description, various buses are all labeled as the bus system 1005 in FIG. 10.

The user interface 1003 may include a display, a keyboard, or a pointing device (for example, a mouse, a trackball), a touch pad, or a touch screen, etc.

It should be appreciated that the memory 1002 in this embodiment of the present disclosure may be a volatile memory or a non-volatile memory, or may include both the volatile memory and the non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random access memory (Random Access Memory, RAM) that acts as an external cache. By way of example and not limitation, many forms of RAMs may be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM) and a direct Rambus random access memory (Direct Rambus RAM, DRRAM). The memory 1002 of the systems and methods described in the embodiments of the present disclosure is intended to include, without being limited to, these and any other suitable types of memories.

In some embodiments, the memory 1002 stores the following elements, executable modules or data structures, or a subset thereof, or an extended set thereof: an operating system 10021 and an application 10022.

The operating system 10021 includes various system programs, such as a framework layer, a core library layer and a driver layer, for implementing various basic services and processing hardware-based tasks. The application 10022 includes various applications, such as a media player (Media Player) and a browser (Browser), for implementing various application services. A program implementing the method of the embodiments of the present disclosure may be included in the application 10022.

In the embodiments of the present disclosure, by calling a program or instruction stored in the memory 1002, specifically, a program or instruction stored in the application 10022, the following steps are implemented during execution: receiving a physical layer signaling or a media access control (MAC) layer signaling from a network side, wherein the physical layer signaling or the MAC layer signaling indicates the SFI of the UE or a plurality of UEs including the UE; determining the SFI of the UE according to the physical layer signaling or the MAC layer signaling.

In another embodiment of the present disclosure, the following steps may be implemented when a program or an instruction stored in the memory 1002, specifically, a program or an instruction stored in the application 10022, is executed: receiving a physical layer signaling or an MAC layer signaling from a network side, wherein the physical layer signaling or the MAC layer signaling indicates a monitoring behavior of the UE or a plurality of UEs including the UE with respect to a PDCCH; determining the monitoring behavior of the UE with respect to the PDCCH according to the physical layer signaling or the MAC layer signaling.

The user equipment provided by the embodiments of the present disclosure may execute the above method embodiments, and implementation principles and technical effects thereof are similar, a description thereof will not be repeated in this embodiment.

Figure 11:
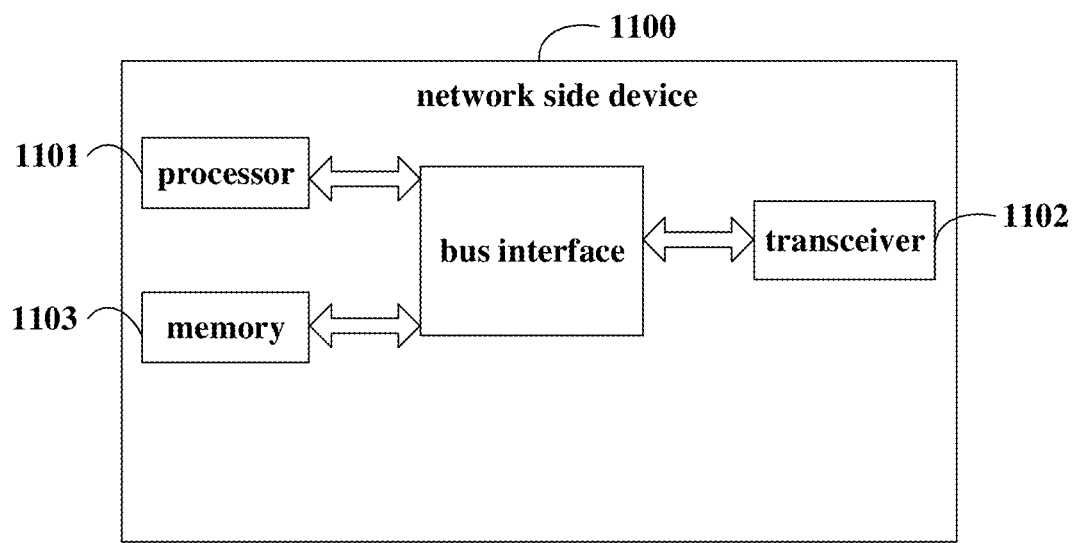
FIG. 11 is a third structural diagram of the network side device according to an embodiment of the disclosure.

Referring to FIG. 11, another network side device 1100 is provided by an embodiment of the present disclosure, including: a processor 1101, a transceiver 1102, a memory 1103, a user interface 1104, and a bus interface.

The processor 1101 may be responsible for managing bus architecture and general processing. The memory 1103 may store data used by the processor 1101 when performing operations.

In an embodiment of the present disclosure, the network side device 1100 may further include: a computer program stored in the memory 1103 and capable of being executed by the processor 1101, wherein the processor 1101 is used to execute the computer program to implement: transmitting a physical layer signaling or an MAC layer signaling to one or more UEs, wherein the physical layer signaling or the MAC layer signaling indicates an SFI of the one or more UEs.

In another embodiment of the present disclosure, the network side device 1100 may further include: a computer program stored in the memory 1103 and capable of being executed by the processor 1101, wherein the processor 1101 is used to execute the computer program to implement: transmitting a physical layer signaling or an MAC layer signaling to one or more UEs, wherein the physical layer signaling or the MAC layer signaling indicates a monitoring behavior of the one or more UEs with respect to a PDCCH In FIG. 11, the bus architecture may include any number of interconnected buses and bridges, specifically various circuits of one or more processors represented by the processor 1101 and memories represented by the memory 1103 are linked together. The bus architecture may also link together various other circuits such as peripheral devices, voltage regulators, and power management circuits, etc., which are all known in the art. Therefore, the embodiments of the present disclosure will not further describe them. The bus interface provides an interface. The transceiver 1102 may be a plurality of elements, that is, including a transmitter and a receiver, and provide a unit for communicating with various other devices on the transmission medium.

Steps of a method or an algorithm described in combination with the present disclosure may be implemented in hardware, or may be implemented in a software instruction executed by a processor. The software instruction may be composed of a corresponding software module, and the software module may be stored in a RAM, flash memory, ROM, EPROM, EEPROM, register, hard disk, mobile hard disk, read-only optical disk, or any other form of storage medium known in the art. An exemplary storage medium is coupled to the processor, so that the processor can read information from, and write information to, the storage medium. Naturally, the storage medium may also be a part of the processor. The processor and the storage medium may be arranged in an application specific integrated circuit (ASIC). In addition, the ASIC may be arranged in a core network interface device. Naturally, the processor and the storage medium may also exist in the core network interface device as discrete components.

A person skilled in the art should appreciate that, in one or more of the above examples, the functions described in the present disclosure may be implemented in hardware, software, firmware, or any combination thereof. When being implemented in software, the functions may be stored on a computer-readable medium or transmitted as one or more instructions or codes on the computer-readable medium. The computer-readable medium includes a computer storage medium and a communication medium, wherein the communication medium includes any medium that facilitates transfer of a computer program from one place to another. The storage medium may be any available medium that may be accessed by a general purpose or special purpose computer.

Specific implementations described above further describe objectives, technical solutions, and beneficial effects of the present disclosure in detail. It should be understood that the above descriptions are merely specific implementations of the present disclosure, and are not intended to limit the protection scope of the present disclosure. Any modification, equivalent replacement, or improvement, and the like made based on the technical solutions of the present disclosure shall be included in the protection scope of the present disclosure.

A person skilled in the art should understand that the embodiments of the present disclosure may be provided as a method, a system, or a computer program product. Therefore, the embodiments of the present disclosure may take a form of entirely hardware embodiments, entirely software embodiments, or embodiments combining software and hardware. Moreover, the embodiments of the present disclosure may take a form of a computer program product implemented on one or more computer-usable storage medium (including but not limited to disk storage, Compact Disc (CD)-ROM, optical storage, etc.) containing computer-usable program code.

The embodiments of the present disclosure are described with reference to flowcharts and/or block diagrams of methods, devices (systems), and computer program products according to the embodiments of the present disclosure. It should be appreciated that each flow and/or block in the flowcharts and/or block diagrams, and combinations of flows and/or blocks in the flowcharts and/or block diagrams can be implemented by computer program instructions. These computer program instructions may be provided to a processor of a general-purpose computer, a special-purpose computer, an embedded processor, or other programmable data processing device to produce a machine, so that instructions executed by the processor of the computer or the other programmable data processing device are used to generate a device for implementing functions specified in one or more flows of the flowchart and/or one or more blocks of the block diagram.

These computer program instructions may also be stored in a computer-readable memory capable of directing a computer or other programmable data processing device to operate in a specific manner, so that the instructions stored in the computer-readable memory produce a product including an instruction device. The instruction device implements functions specified in one or more flows of the flowchart and/or one or more blocks of the block diagram.

These computer program instructions may also be loaded onto the computer or the other programmable data processing device, so that a series of operational steps may be performed on the computer or the other programmable device to generate a computer-implemented process, and the computer or the other programmable device executes the instructions to provide steps for implementing functions specified in one or more flows of the flowchart and/or one or more blocks of the block diagram.

Obviously, a person skilled in the art can make various modifications and variations to the embodiments of the present disclosure without departing from the spirit and scope of the present disclosure. Thus, when these modifications and variations of the embodiments of the present disclosure fall within the scope of the claims and their equivalent of the present disclosure, the present disclosure also intends to include these modifications and variations.

What is claimed is:

1. A method for monitoring a physical downlink control channel, which is operable by a user equipment (UE) and comprises:
    receiving a physical layer signaling from a network side, wherein the physical layer signaling indicates a monitoring behavior of a plurality of UEs comprising the UE with respect to a physical downlink control channel (PDCCH);
    determining the UE whether to monitor the PDCCH on the subsequent N slots according to the physical layer signaling,
    wherein the physical layer signaling comprises a plurality of bits, indicating an $i^{th}$ UE of the plurality of UEs to monitor the PDCCH when 1 is set to an $i^{th}$ bit of the plurality of bits, and indicating the $i^{th}$ UE of the plurality of UEs to not monitor the PDCCH when 0 is set to the $i^{th}$ bit of the plurality of bits, wherein i represents a positive integer that is not greater than the quantity of the plurality of UEs.

2. The method according to claim 1, wherein receiving the physical layer signaling from the network side comprises:
    receiving a physical layer signaling on the PDCCH with a downlink control information (DCI) format.

3. The method according to claim 2, wherein cyclic redundancy check (CRC) of the PDCCH with the DCI format is scrambled by a radio network temporary identifier (RNTI) dedicated to the UE, or the CRC of the PDCCH with the DCI format is scrambled by an RNTI corresponding to the plurality of UEs.

4. The method according to claim 1, wherein the physical layer signaling indicating the monitoring behavior of the plurality of UEs comprising the UE with respect to the PDCCH comprises at least one of:
    that the physical layer signaling indicates a monitoring behavior of the plurality of UEs comprising the UE with respect to the PDCCH on subsequent N slots;
    that the physical layer signaling indicates a monitoring behavior of the plurality of UEs comprising the UE with respect to a PDCCH with one or more DCI formats on the subsequent N slots;
    that the physical layer signaling indicates a monitoring behavior of the plurality of UEs comprising the UE with respect to a PDCCH with one or more RNTI types on the subsequent N slots;
    that the physical layer signaling indicates a monitoring behavior of the plurality of UEs comprising the UE with respect to a PDCCH belonging to one or more search spaces on the subsequent N slots;
    that the physical layer signaling indicates a monitoring behavior of the plurality of UEs comprising the UE with respect to a PDCCH belonging to one or more search space types on the subsequent N slots,
    wherein N is greater than or equal to 1.

5. The method according to claim 4, wherein the monitoring behavior comprises:
    monitoring the PDCCH on a target time domain symbol of the subsequent N slots, wherein the plurality of UEs comprising the UE monitor the PDCCH on the target time domain symbol.

6. The method according to claim 4, wherein the subsequent N slots comprise at least one of:
    subsequent N continuous or discontinuous slots;
    subsequent N continuous or discontinuous downlink slots;
    subsequent N continuous or discontinuous downlink slots and/or flexible slots, wherein a time domain symbol comprised in the downlink slot is a downlink symbol or a flexible symbol.

7. The method according to claim 4, wherein there is an interval between a slot in which the physical layer signaling is received and a first slot in the subsequent N slots,
wherein the interval is zero slot or a fixed number of slots predefined by a protocol, or a length of the interval is configured by the network side.

8. A method for configuring a monitoring mode of a downlink control channel, which is operable by a network side device and comprises:
transmitting a physical layer signaling to a plurality of UEs, wherein the physical layer signaling indicates the plurality of UEs whether to monitor the PDCCH on the subsequent N slots,
wherein the physical layer signaling comprises a plurality of bits, indicating an $i^{th}$ UE of the plurality of UEs to monitor the PDCCH when 1 is set to an $i^{th}$ bit of the plurality of bits, and indicating the $i^{th}$ UE of the plurality of UEs to not monitor the PDCCH when 0 is set to the $i^{th}$ bit of the plurality of bits, wherein i represents a positive integer that is not greater than the quantity of the plurality of UEs.

9. The method according to claim 8, wherein transmitting the physical layer signaling to the plurality of UEs comprises:
transmitting the physical layer signaling to the plurality of UEs on a PDCCH with a DCI format.

10. The method according to claim 9, wherein cyclic redundancy check (CRC) of the PDCCH with the DCI format is scrambled by a Radio network temporary identifier (RNTI) dedicated to the UE, or the CRC of the PDCCH with the DCI format is scrambled by an RNTI corresponding to a plurality of UEs.

11. The method according to claim 8, wherein the physical layer signaling indicating the monitoring behavior of the plurality of UEs with respect to the PDCCH comprises at least one of:
that the physical layer signaling indicates a monitoring behavior of the plurality of UEs with respect to the PDCCH on subsequent N slots;
that the physical layer signaling indicates a monitoring behavior of the plurality of UEs with respect to a PDCCH with one or more DCI formats on the subsequent N slots;
that the physical layer signaling indicates a monitoring behavior of the plurality of UEs with respect to a PDCCH with one or more RNTI types on the subsequent N slots;
that the physical layer signaling indicates a monitoring behavior of the plurality of UEs with respect to a PDCCH belonging to one or more search spaces on the subsequent N slots;
that the physical layer signaling indicates a monitoring behavior of the plurality of UEs with respect to a PDCCH belonging to one or more search space types on the subsequent N slots,
wherein N is greater than or equal to 1.

12. The method according to claim 11, wherein the monitoring behavior comprises:
monitoring the PDCCH on a target time domain symbol of the subsequent N slots, wherein the plurality of UEs monitor the PDCCH on the target time domain symbol.

13. The method according to claim 11, wherein the subsequent N slots comprise at least one of:
subsequent N continuous or discontinuous slots;
subsequent N continuous or discontinuous downlink slots;
subsequent N continuous or discontinuous downlink slots and/or flexible slots,
wherein a time domain symbol comprised in the downlink slot is a downlink symbol or a flexible symbol.

14. A user equipment, comprising: a processor, a memory, and a computer program stored in the memory and capable of being executed by the processor, wherein the processor is used to execute the computer program to:
receive a physical layer signaling from a network side, wherein the physical layer signaling indicates a monitoring behavior of a plurality of UEs comprising the UE with respect to a PDCCH;
determine the UE whether to monitor the PDCCH on the subsequent N slots according to the physical layer signaling,
wherein the physical layer signaling comprises a plurality of bits, indicating an $i^{th}$ UE of the plurality of UEs to monitor the PDCCH when 1 is set to an $i^{th}$ bit of the plurality of bits, and indicating the $i^{th}$ UE of the plurality of UEs to not monitor the PDCCH when 0 is set to the $i^{th}$ bit of the plurality of bits, wherein i represents a positive integer that is not greater than the quantity of the plurality of UEs.

15. The user equipment according to claim 14, wherein the processor is further used to execute the computer program to:
receive a physical layer signaling on the PDCCH with a DCI format.

16. The user equipment according to claim 15, wherein CRC of the PDCCH with the DCI format is scrambled by a RNTI dedicated to the UE, or the CRC of the PDCCH with the DCI format is scrambled by an RNTI corresponding to the plurality of UEs.

17. The user equipment according to claim 14, wherein the physical layer signaling indicating the monitoring behavior of the plurality of UEs comprising the UE with respect to the PDCCH comprises at least one of:
that the physical layer signaling indicates a monitoring behavior of the plurality of UEs comprising the UE with respect to the PDCCH on subsequent N slots;
that the physical layer signaling indicates a monitoring behavior of the plurality of UEs comprising the UE with respect to a PDCCH with one or more DCI formats on the subsequent N slots;
that the physical layer signaling indicates a monitoring behavior of the plurality of UEs comprising the UE with respect to a PDCCH with one or more RNTI types on the subsequent N slots;
that the physical layer signaling indicates a monitoring behavior of the plurality of UEs comprising the UE with respect to a PDCCH belonging to one or more search spaces on the subsequent N slots;
that the physical layer signaling indicates a monitoring behavior of the plurality of UEs comprising the UE with respect to a PDCCH belonging to one or more search space types on the subsequent N slots,
wherein N is greater than or equal to 1.

18. The user equipment according to claim 17, wherein the monitoring behavior comprises:

monitoring the PDCCH on a target time domain symbol of the subsequent N slots, wherein the plurality of UEs comprising the UE monitor the PDCCH on the target time domain symbol.

19. The user equipment according to claim 17, wherein the subsequent N slots comprise at least one of:

subsequent N continuous or discontinuous slots;

subsequent N continuous or discontinuous downlink slots;

subsequent N continuous or discontinuous downlink slots and/or flexible slots, wherein a time domain symbol comprised in the downlink slot is a downlink symbol or a flexible symbol.

20. A network side device, comprising: a processor, a memory, and a computer program stored in the memory and capable of being executed by the processor, wherein the processor is used to execute the computer program to implement the steps of the method for configuring the monitoring mode of the downlink control channel according to claim 8.

* * * * *